United States Patent Office 3,644,357
Patented Feb. 22, 1972

3,644,357
DERIVATIVES OF THIENO[3,4-α]PYRIMIDINE
AND PREPARATION THEREOF
Real Laliberte, Laval, Quebec, Canada, assignor to Ayerst, McKenna and Harrison Limited, St. Laurent, Quebec, Canada
No Drawing. Filed Feb. 27, 1969, Ser. No. 803,083
Int. Cl. C07d 99/06
U.S. Cl. 260—256.5 R
5 Claims

ABSTRACT OF THE DISCLOSURE

5 - aminothieno[3,4-d]pyrimidin - 4(3H) - one derivatives of Formula I,

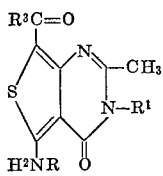

in which $R^1$ represents a lower alkyl group containing from one to two carbon atoms, a dimethylamino group or a piperidino group; $R^2$ represents a lower alkyl group containing from one to two carbon atoms, a phenyl group or a 3-nitrophenyl group; and $R^3$ represents a methyl group, a phenyl group, or a 4-biphenylyl group.

The compounds are prepared by condensing an apprepriately substituted isothiocyanate with an appropriately substituted cyancacetamide to yield the correspondingly substituted 3-amino - 2 - cyano - 3 - mercaptoacrylamide, condensing the latter with a halomethyl ketone to yield the correspondingly substituted 2,4-diamine-3-thiophenecarboxamide, and treating the latter intermediates with acetic anhydride. The compounds possess antibacterial activities.

BACKGROUND OF THE INVENTION

This invention relates to 5-aminothieno[3,4-d]pyrimidin-4(3H)-one derivatives, to a process for their preparation and to intermediates used in this process.

More specifically, this invention relates to tetrasubstituted 5 - aminothieno[3,4-d]pyrimidin - 4(3H) - one derivatives which exhibit antibacterial activity against a wide variety of gram-positive and gram-negative microorganisms. In addition, another important aspect relating to this invention is that the said derivatives may be prepared by an efficient process from readily available starting materials.

The combination of the qualities of broad spectrum antibacterial activity and ready accessibility provide the compounds of this invention with features that are desirable for antibacterial agent.

SUMMARY OF THE INVENTION

The 5 - aminothieno[3,4-d]pyrimidin - 4(3H) - one derivatives of this invention may be represented by Formula I,

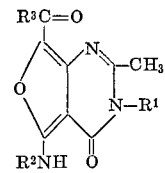

in which $R^1$ represents a lower alkyl group containing from one to two carbon atoms, a dimethylamino group or a piperidino group; $R^2$ represents a lower alkyl group containing from one to two carbon atoms, a phenyl group or a 3-nitrophenyl group; and $R_3$ represents a methyl group, a phenyl group, or a 4-biphenylyl group.

DETAILS OF THE INVENTION

The 5-aminothieno[3,4-d]pyrimidin - 4(3H) - one derivatives of this invention have been found to possess interesting antibacterial activity against a variety of bacteria. More particularly, the antibacterial activity of the compounds of this invention may be demonstrated against a number of gram-positive and gram-negative microorganisms, such as, Staphylococcus pyogenes, both penicillin sensitive and penicillin resistant, Sarcina lutea, Streptococcus fecalis, Escherichia coli, Aerobacter aerogenes, Salmonella pullorum, Proteus mirabilis and Proteus vulgaris, in standard tests for antibacterial activity, such as those described by C. W. Rammelkamp in Proc. Soc. Exp. Biol. Med., vol. 51, p. 95 (1942) or by D. C. Grove and W. A. Randall in "Assay Methods of Antibiotics," Med. Encycl. Inc., New York 1955.

When the 5 - aminothieno[3,4-d]pyrimidin - 4(3H)-one derivatives of this invention are employed as antibacterial agents, they are administered to warm-blooded animals, for example, mice, either alone, or in combination with pharmaceutically acceptable carriers. The portion of the agent administered is determined by the solubility and chemical nature of the compound, chosen route of administration and standard biological practice. For example, they may be administered orally in solid form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic. In addition, the agent may be employed topically. For topical application they may be formulated in the form of solutions, creams, or lotions in pharmaceutically acceptable vehicles containing 0.1–5 percent, preferably, 1 percent of the agent and may be administered topically to the infected area of the skin.

For oral or parenteral administration, the dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo although as aforementioned variations will occur. However, a dosage level that is in the range of from about 0.5 mg. to about 10 mg. per kilo is most satisfactory. Such doses may be administered once or twice a day, as required.

The 5-aminothieno[3,4-d]pyrimidin-4(3H)-one derivatives of this invention are prepared by the following general method.

A commercially available isothiocyanate of the formula $R^2NCS$ (II), in which $R^2$ is as defined above, is condensed in the presence of an alkali metal lower alkoxide, for example, sodium ethoxide, preferably one to two molar equivalents, in a lower alkanol, for example, ethanol, with substantially one molar equivalent of a cyanoacetamide derivative of Formula III in which $R^1$ is as defined above, yielding the alkali metal salt of a 3-amino-2-cyano-3-mercaptoacrylamide derivative of Formula IV in which $R^1$ and $R^2$ are as defined above and Met represents an alkali metal, such as, for example, sodium.

The cyanoacetamide derivatives of Formula III in which $R^1$ represents a methyl, ethyl, dimethylamino or piperidino group may be readily prepared by condensing the commercially available methyl cyanoacetate or ethyl cyanoacetate with methylamine, ethylamine, 1,1-dimethylhydrazine or 1-aminopiperidine, respectively, according to the method of K. G. Naik and Y. N. Bhat, Quart, J. Indian Chem. Soc., vol. 4, p. 547 (1927); Chem. Abstr., vol. 22, p. 2353 (1928).

The alkali salt of the 3-amino-2-cyano-3-mercaptoacrylamide derivative of Formula IV, obtained in the above reaction, may be isolated, but such isolation is not necessary and either the reaction mixture or the intermediate of Formula IV may be treated directly with substantially one molar equivalent of a commercially available halomethyl ketone of the Formula V, $R^3COCH_2X$ in which $R^3$ is as defined above and X represents chlorine or bromine, in solution in a lower alkanol. The latter reaction is carried out most advantageously at temperatures between 0° and 40° C., and preferably at 5°–10° C. In this manner the 2,4-diamino-3-thiophenecarboxamide derivatives of Formula VI in which $R^1$, $R^2$ and $R^3$ are defined as above, are obtained.

The preferred halomethyl ketones of Formula V used in the preceding reaction are the commercially available α-chloroacetone (V, $R^3=CH_3$ and X=Cl), 2-chloroacetophenone (V, $R^3$=phenyl and X=Cl) or 2 - bromo-4′-phenylacetophenone (V, $R^3$=4′-biphenylyl and X=Br).

Finally, treatment of the 2,4-diamino-3-thiophenecarboxamide derivatives of Formula VI, obtained as described above, with an excess of acetic anhydride in the presence of an organic base selected from the group consisting of cyclic-nitrogen-containing bases and tertiary amines, such as, for example, pyridine, or a tri(lower alkyl)amine or a di-(lower alkyl)aniline in which each lower alkyl group contains from 1 to 4 carbon atoms, such as, for example, triethylamine or dimethylaniline, preferably in an inert solvent, readily affords the 5-aminothieno[3,4-d]-pyrimidin-4(3H)-one derivatives of Formula I of this invention in which $R^1$, $R^2$ and $R^3$ are as described above. Any practical solvent inert to the reaction conditions may be employed; benzene is quite suitable for this purpose. Preferred ranges for reaction time and temperature are from one-half to twenty-four hours and 20° C. to the boiling point of the reaction mixture, respectively.

The following examples and formulae, in which $R^1$, $R^2$, $R^3$, Met and X have the same significance as defined above will illustrate this invention.

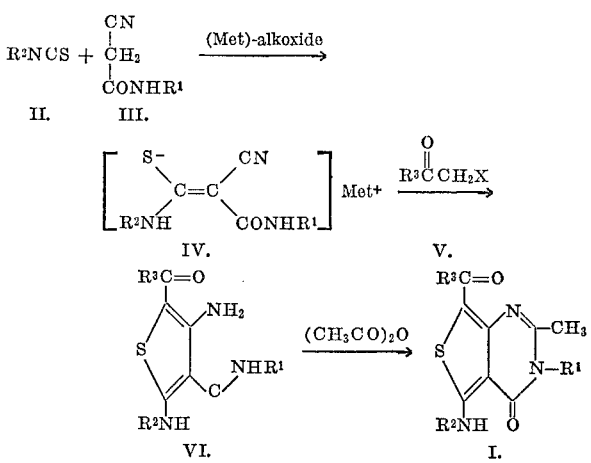

EXAMPLE 1

N - methyl-cyanoacetamide, (0.051 mole) and 0.051 mole of phenyl isothiocyanate, are added to a solution of sodium ethoxide (0.112 mole of sodium in 100 ml. of ethanol). The mixture is refluxed for one and one-half hours, filtered and the filtrate evaporated to dryness. The sodium salt of 3 - anilino-2-cyano-3-mercapto-N-methylacrylamide is obtained as a yellow oil which is dissolved in water and on acidification with hydrochloric acid, a yellow solid is formed which is filtered off and crystallized from methanol, toluene and isopropanol, to yield the acrylamide derivative, 3 - anilino-2-cyano-3-mercapto-N-methylacrylamide, M.P. 154–156° C.

EXAMPLE 2

To a 250 ml., 3-neck, round-bottomed flask, fitted with a mechanical stirrer, a condenser and a dropping funnel, 0.02 mole of sodium in 100 ml. of ethanol and 0.02 mole of 3 - anilino-2-cyano-3-mercapto-N-methacrylamide, obtained as described in Example 1 are added. The solution is cooled to 5° C. and 0.02 mole of the halomethyl ketone, 2-chloroacetophenone, in 50 ml. of ethanol is added dropwise through the dropping funnel with constant stirring, while the reaction temperature is kept at 5° C. The mixture is allowed to stay at this temperature for one hour. After evaporation of the solvent, a yellow solid is filtered off, washed several times with water and isopropanol, and crystallized twice from isopropanol, to give the 2,4-diamino-3-thiophenecarboxamide derivative, 4-amino-2-anilino-5-benzoylthiophene - 3 - N - methylcarboxamide (VI; $R^1=CH_3$, $R^2$=phenyl and $R^3$=phenyl) M.P. 207–209° C. (dec.).

EXAMPLE 3

To a solution of sodium ethoxide (0.12 mole) in 300 ml. of ethanol, 0.12 mole of the cyanoacetamide derivative, N-methylcyanoacetamide, and 0.12 mole of the isothiocyanate, methyl isothiocyanate, are added. The mixture is heated on the steam bath for 2 hours, filtered and the filtrate is cooled to 5° C. and poured in a 1-litre, 3-necked, round-bottomed flask, fitted with a mechanical stirrer, a thermometer and a dropping funnnel. The halomethylketoe, 2-chloroacetophenone, (0.15 mole) in 250 ml. of ethanol is added dropwise through the dropping funnel with constant stirring and keeping the reaction temperature between 5° and 10° C. After the addition, the mixture is kept for two hours at room temperature and the solid which precipitates is filtered off, and washed with water and isopropanol. The filtrate is evaporated to dryness to give an oily solid which is dissolved in chloroform and washed with water. Evaporation of the chloroform yields a solid which is collected. Both solids portions are combined and crystallised from acetonitrile to give 4-amino-5-benzoyl - 2 - methylaminothiophene-3-N-methylcarboxamide (VI; $R^1=CH_3$, $R^2=CH_3$ and $R^3=$phenyl), M.P. 220–222° C.

EXAMPLE 4

By using the combination of manipulative procedures described in Examples 1 and 2 in the order as they appear above or the maniulative procedure described in Example 3 together with the approriate commercially available isothiocyanate, methyl isothiocyanate, ethyl isothiocyanate, phenyl isothiocyanate or 3-nitrophenyl isothiocyanate, the appropriate cyanoacetamide derivative, N-methyl-cyanoacetamide, N-ethyl-cyanoacetamide, cyanoacetic acid N,N-dimethylhydrazide or 2-cyano-N-(1-piperidinyl) acetamide, M.P. 131° C., prepared as described above, and the appropriate commercially available halomethyl ketones, described above, the following 2,4-diamino-3-thiophenecarboxamide derivatives of Formula VI are obtained:

5-acetyl-4-amino-2-methylaminothiophene-3-N-methylcarboxamide, M.P. 221–223° C.,
5-acetyl-4-amino-2-ethylaminothiophene-3-N-methylcarboxamide,
5-acetyl-4-amino-2-anilinothiophene-3-N-methylcarboxamide,
5-acetyl-4-amino-2-(3-nitrophenyl)aminothiophene-3-N-methylcarboxamide,
5-acetyl-4-amino-2-methylaminothiophene-3-N-ethylcarboxamide,
5-acetyl-4-amino-2-ethylaminothiophene-3-N-ethylcarboxamide,
5-acetyl-4-amino-2-anilinothiophene-3-N-ethylcarboxamide,
5-acetyl-4-amino-2-(3-nitrophenyl)aminothiophene-3-N-ethylcarboxamide,
5-acetyl-4-amino-2-methylaminothiophene-3-carboxylic acid, N,N-dimethylhydrazide,
5-acetyl-4-amino-2-ethylaminothiophene-3-carboxylic acid N,N-dimethylhydrazide,
5-acetyl-4-amino-2-anilinothiophene-3-carboxylic acid N,N-dimethylhydrazide,
5-acetyl-4-amino-2-(3-nitrophenyl)aminothiophene-3-carboxylic acid N,N-methylhydrazide,
5-acetyl-4-amino-2-methylaminothiophene-3-N-piperidinocarboxamide,
5-acetyl-4-amino-2-ethylaminothiophene-3-N-piperidinocarboxamide,
5-acetyl-4-amino-2-anilinothiophene-3-N-piperidinocarboxamide,
5-acetyl-4-amino-2-(3-nitrophenyl)aminothiophene-3-N-piperidinocarboxamide,
4-amino-5-benzoyl-2-methylaminothiophene-3-N-methylcarboxamide, M.P. 220–222° C.,
4-amino-5-benzoyl-2-ethylaminothiophene-3-N-methylcarboxamide,
4-amino-5-benzoyl-2-anilinothiophene-3-N-methylcarboxamide,
4-amino-5-benzoyl-2-(3-nitrophenyl)aminothiophene-3-N-methylcarboxamide,
4-amino-5-benzoyl-2-methylaminothiophene-3-N-ethylcarboxamide,
4-amino-5-benzoyl-2-ethylaminothiophene-3-N-ethylcarboxamide,
4-amino-5-benzoyl-2-anilinothiophene-3-N-ethylcarboxamide,
4-amino-5-benzoyl-2-(3-nitrophenyl)aminothiophene-3-N-ethylcarboxamide,
4-amino-5-benzoyl-2-methylaminothiophene-3-carboxylic acid N,N-dimethyl hydrazide,
4-amino-5-benzoyl-2-ethylaminothiophene-3-carboxylic acid N,N-dimethyl hydrazide,
4-amino-5-benzoyl-2-anilinothiophene-3-carboxylic acid N,N-dimethyl hydrazide, M.P. 232–234° C.,
4-amino-5-benzoyl-2-(3-nitrophenyl)aminothiophene-3-carboxylic acid N,N-dimethyl hydrazide,
4-amino-5-benzoyl-2-methylaminothiophene-3-N-piperidinocarboxamide,
4-amino-5-benzoyl-2-ethylaminothiophene-3-N-piperidinocarboxamide,
4-amino-5-benzoyl-2-anilinothiophene-3-N-piperidinocarboxamide, M.P. 243–245° C.,
4-amino-5-benzoyl-2-(3-nitrophenyl)aminothiophene-3-N-piperidinocarboxamide,
4-amino-5-(4'-biphenylylcarbonyl)-2-methylaminothiophene-3-N-methylcarboxamide,
4-amino-5-(4'-biphenylylcarbonyl)-2-ethylaminothiophene-3-N-methylcarboxamide,
4-amino-5-(4'-biphenylylcarbonyl)-2-anilinothiophene-3-N-methylcarboxamide,
4-amino-5-(4'-biphenylylcarbonyl)-2-(3-nitrophenyl) aminothiophene-3-N-methylcarboxamide,
4-amino-5-(4'-biphenylylcarbonyl)-2-methylaminothiophene-3-N-ethylcarboxamide,
4-amino-5-(4'-biphenylylcarbonyl)-2-ethylaminothiophene-3-N-ethylcarboxamide,
4-amino-5-(4'-biphenylylcarbonyl)-2-anilinothiophene-3-N-ethylcarboxamide,
4-amino-5-(4'-biphenylylcarbonyl)-2-(3-nitrophenyl) aminothiophene-3-N-ethylcarboxamide,
4-amino-5-(4'-biphenylylcarbonyl)-2-methylaminothiophene-3-carboxylic acid N,N-dimethylhydrazide,
4-amino-5-(4'-biphenylylcarbonyl)-2-ethylaminothiophene-3-carboxylic acid N,N-dimethylhydrazide,
4-amino-5-(4'-biphenylylcarbonyl)-2-anilinothiophene-3-carboxylic acid N,N-dimethylhydrazide,
4-amino-5-(4'-biphenylylcarbonyl)-2-(3-nitrophenyl) aminothiophene-3-carboxylic acid N,N-dimethylhydrazide,
4-amino-5-(4'-biphenylylcarbonyl)-2-methylaminothiophene-3-N-piperidinocarboxamide,
4-amino-5-(4'-biphenylylcarbonyl)-2-ethylaminothiophene-3-N-piperidinocarboxamide,
4-amino-5-(4'-biphenylylcarbonyl)-2-anilinothiophene-3-N-piperidinocarboxamide,
4-amino-5-(4'-biphenylylcarbonyl)-2-(3-nitrophenyl) aminothiophene-3-N-piperdinocarboxamide.

EXAMPLE 5

To 0.033 mole of the 2,4-diamino-3-thiophenecarboxamide derivative, 4 - amino-5-benzoyl-2-anilinothiophene-3 - carboxylic acid N,N-dimethylhydrazide, prepared as described in Example 4, in 250 ml. of benzene, 0.165 mole of acetic anhydride and seven drops of pyridine are added. The mixture is boiled for 16 hours. After cooling, the resultant solid is collected, washed with isopropanol, and recrystallized from 2 - methoxyethanol to yield the 5-aminothieno[3,4-d]pyrimidin - 4(3H) - one derivative of this invention, 5 - anilino - 7 - benzoyl - 3 - dimethylamino - 2 - methylthieno[3,4 - d]pyrimidin-4(3H)-one, M.P. 223–224° C., $$\gamma_{max.}^{EtOH} \ 182 \ m\mu \ (\epsilon \ 27{,}700)$$

321 m$\mu$ ($\epsilon$ 6460) and 380 m$\mu$ ($\epsilon$ 19,250).

In the same manner, but using an equivalent amount of one of the remaining 2,4-diamino-3-thiophenecarboxamide derivatives described in Example 4 instead of 4-amino-5-benzoyl-2-anilinothiophene - 3 - carboxylic acid N,N-dimethylhydrazide, the following corresponding 5-aminothieno[3,4-d]pyrimidin-4(3H)-one derivatives of this invention are obtained: 7 - acetyl - 2,3-dimethyl-5-methyl-aminothieno[3,4-d]pyrimidin - 4(3H) - one, M.P. 276–278° C., $\lambda_{max.}^{EtOH}$ 282 mμ (ε 27,700)

321 mμ (ε 6460) and 380 mμ (ε 19,250).

7-acetyl-2,3-dimethyl-5-ethylaminothieno[3,4-d]pyrimidin-4(3H)-one,
7-acetyl-2,3-dimethyl-5-anilinothieno[3,4-d]pyrimidin-4(3H)-one,
7-acetyl-2,3-dimethyl-5-(3-nitrophenyl)aminothieno-[3,4-d]pyrimidin-4(3H)-one,
7-benzoyl-2,3-dimethyl-5-methylaminothieno[3,4-d]pyrimidin-4(3H)-one,
7-benzoyl-2,3-dimethyl-5-ethylaminothieno[3,4-d]pyrimidin-4(3H)-one,
7-benzoyl-2,3-dimethyl-5-anilinothieno[3,4-d]pyrimidin-4(3H)-one, M.P. 232–234° C., $\lambda_{max.}^{EtOH}$ 247 mμ (ε 13,880)

288 mμ (ε 22,600) and 420 mμ (ε 23,600),
7-benzoyl-2,3-dimethyl-5-(3-nitrophenyl)amino-thieno[3,4-d]pyrimidin-4(3H)-one,
7-(4'-biphenylylcarbonyl)-2,3-dimethyl-5-methylamino-thieno[3,4-d]pyrimidin-4(3H)-one,
7-(4'-biphenylylcarbonyl)-2,3-dimethyl-5-ethylamino-thieno[3,4-d]pyrimidin-4(3H)-one,
7-(4'-biphenylylcarbonyl)2,3-dimethyl-5-anilinothieno-[3,4-d]pyrimidin-4(3H)-one,
7-(4'-biphenylylcarbonyl)-2,3-dimethyl-5-(3-nitrophenyl)aminothieno[3,4-d]pyrimidin-4(3H)-one,
7-acetyl-3-ethyl-5-methylamino-2-methylthieno[3,4-d]pyrimidin-3(4H)-one,
7-acetyl-3-ethyl-5-ethylamino-2-methylthieno[3,4-d]pyrimidin-3(4H)-one,
7-acetyl-3-ethyl-5-anilino-2-methylthieno[3,4-d]pyrimidin-3(4H)-one,
7-acetyl-3-ethyl-5-(3-nitrophenyl)amino-2-methylthieno-[3,4-d]pyrimidin-3(4H)-one,
7-benzoyl-3-ethyl-5-methylamino-2-methylthieno-[3,4-d]pyrimidin-3(4H)-one,
7-benzoyl-3-ethyl-5-ethylamino-2-methylthieno[3,4-d]pyrimidin-3(4H)-one,
7-benzoyl-3-ethyl-5-anilino-2-methylthieno[3,4-d]pyrimidin-3(4H)-one,
7-benzoyl-3-ethyl-5-(3-nitrophenyl)amino-2-methyl-thieno[3,4-d]pyrimidin-3(4H)-one,
7-(4'-biphenylylcarbonyl)-3-ethyl-5-methylamino-2-methylthieno[3,4-d]pyrimidin-3(4H)-one,
7-(4'-biphenylylcarbonyl)-3-ethyl-5-ethyamino-2-methylthieno[3,4-d]pyrimidin-3(4H)-one,
7-(4'-biphenylylcarbonyl)-3-ethyl-5-anilino-2-methyl-thieno[3,4-d]pyrimidin-3(4H)-one,
7-(4'-biphenylylcarbonyl)-3-ethyl-5-(3-nitrophenyl)amino-2-methylthieno[3,4-d]pyrimidin-3(4H)-one,
7-acetyl-3-dimethylamino-5-methylamino-2-methyl[3,4-d]pyrimidin-3(4H)-one,
7-acetyl-3-dimethylamino-5-ethylamino-2-methylthieno[3,4-d]pyrimidin-3(4H)-one,
7-acetyl-3-dimethylamino-5-anilino-2-methylthieno[3,4-d]pyrimidin-3(4H)-one,
7-acetyl-3-dimethylamino-5-(3-nitrophenyl)amino-2-methylthieno[3,4-d]pyrimidin-3(4H)-one,
7-benzoyl-3-dimethylamino-5-methylamino-2-methyl-thieno[3,4-d]pyrimidin-3(4H)-one,
7-benzoyl-3-dimethylamino-5-ethylamino-2-methylthieno[3,4-d]pyrimidin-3(4T)-one,
7-benzoyl-3-dimethylamino-5-(3-nitrophenyl)amino-2-methylthieno[3,4-d]pyrimidin-3(4H)-one,
7-(4'-biphenylyl)-3-dimethylamino-5-methylamino-2-methylthieno[3,4-d]pyrimidin-3(4H)-one,
7-(4'-biphenylyl)-3-dimethylamino-5-ethylamino-2-methylthieno[3,4-d]pyrimidin-3(4H)-one,
7-(4'-biphenylyl)-3-dimethylamino-5-anilino-2-methyl-thieno[3,4-d]pyrimidin-3(4H)-one,
7-(4'-biphenylyl)-3-dimethylamino-5-(3-nitrophenyl)amino-2-methylthieno[3,4-d]pyrimidin-3(4H)-one,
7-acetyl-3-piperidino-5-methylamino-2-methylthieno[3,4-d]pyrimidin-3(4H)-one,
7-acetyl-3-piperidino-5-ethylamino-2-methylthieno[3,4-d]pyrimidin-3(4H)-one,
7-acetyl-3-piperidino-5-anilino-2-methylthieno[3,4-d]pyrimidin-3(4H)-one,
7-acetyl-3-piperidino-5-(3-nitrophenyl)amino-2-methyl-thieno[3,4-d]pyrimidin-3(4H)-one,
7-benzoyl-3-piperidino-5-methylamino-2-methylthieno[3,4-d]pyrimidin-3(4H)-one,
7-benzoyl-3-piperidino-5-ethylamino-2-methylthieno[3,4-d]pyrimidin-3(4H)-one,
7-benzoyl-3-piperidino-5-anilino-2-methylthieno[3,4-d]pyrimidin-3(4H)-one,
7-benzoyl-3-piperidino-5-(3-nitrophenyl)amino-2-methyl-thieno[3,4-d]pyrimidin-3(4H)-one,
7-(4'-biphenylyl-3-piperidino-5-methylamino-2-methyl-thieno[3,4-d]pyrimidin-3(4H)-one,
7-(4'-biphenylyl)-3-piperidino-5-ethylamino-2-methyl-thieno[3,4-d]pyrimidin-3(4H)-one,
7-(4'-biphenylyl)-3-piperidino-5-anilino-2-methylthieno[3,4-d]pyrimidin-3(4H)-one,
7-(4'-biphenylyl)-3-piperidino-5-(3-nitrophenyl)amino-2-methylthieno[3,4-d]pyrimidin-3(4H)-one.

I claim:
1. A compound selected from those of the formula

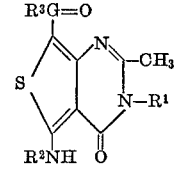

wherein $R^1$ is selected from the group consisting of a lower alkyl containing from one to two carbon atoms, dimethylamino and piperidino; $R^2$ is selected from the group which consists of lower alkyl containing from one to two carbon atoms, phenyl and 3-nitrophenyl; and $R^3$ is selected from the group which consists of methyl, phenyl and 4-biphenylyl.

2. 5 - anilino - 7 - benzoyl - 3 - dimethylamino - 2-methylthieno[3,4-d]pyrimidin-4(3H)-one, as claimed in claim 1.

3. 7 - acetyl - 2,3 - dimethyl - 5 - methylaminothieno [3,4-d]pyrimidin-4(3H)-one, as claimed in claim 1.

4. 7 - benzoyl - 2,3 - dimethyl - 5 - anilinothieno[3,4-d]pyrimidin-4(3H)-one, as claimed in claim 1.

5. A process which comprises condensing a compound of the formula

wherein $R^2$ represents lower alkyl containing from one to two carbon atoms, phenyl or 3-nitrophenyl in the presence of an alkali metal lower alkoxide in a lower alkanol with substantially one molar equivalent of a compound of formula

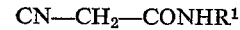

wherein $R^1$ represents lower alkyl containing from one to two carbon atoms, dimethylamino or piperidino and thereby securing a compound of the formula

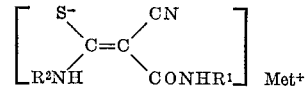

$R^1$ and $R^2$ being as above defined and Met representing the alkali metal of acid alkali metal lower alkoxide; treating said last-name compound with substantially one molar equivalent of a halomethyl ketone of the formula

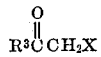

wherein $R^3$ represents methyl, phenyl or 4-biphenylyl and X is a halogen selected from the group which consists of chlorine and bromine by bringing said compounds together in solution in a lower alkanol and thereby securing a compound of the formula

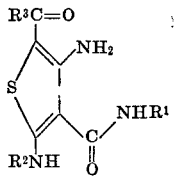

wherein $R^1$, $R^2$ and $R^3$ are as above defined; and treating said last-named compound with excess acetic anhydride in the presence of an organic base selected from the group consisting of cyclic nitrogen-containing bases and tertiary amines in an inert solvent, thereby securing a compound of formula

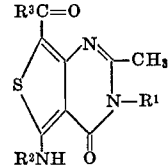

wherein $R^1$, $R^2$ and $R^3$ are as above defined.

References Cited

UNITED STATES PATENTS 3,470,183  9/1969  Roth _____ 260—256.5

ALEX MAZEL, Primary Examiner

R. J. GALLAGHER, Assistant Examiner

U.S. Cl. X.R.

260—293.4 E, 294 A, 332.2 C, 465 D, 999